United States Patent Office 3,349,063
Patented Oct. 24, 1967

3,349,063
ACRYLONITRILE-THIOSULFURIC ACID COMPOUND COPOLYMERS
Rudi Mayer, Leverkusen, Mathildenhof, and Egon Kuntz and Carlhans Süling, Leverkusen, Germany, assignors to Farbenfabriken Bayer Aktiengesellschaft, Leverkusen, Germany, a corporation of Germany
No Drawing. Filed July 31, 1964, Ser. No. 386,772
Claims priority, application Germany, Aug. 21, 1963, F 40,551
10 Claims. (Cl. 260—79.3)

This invention relates to acrylonitrile polymers and particularly to a process for the production of acrylonitrile polymers and to fibres, filaments and films therefrom.

Polymers of an acid character are of great technical interest and widely used. Thus for example, copolymers having a low content of acid groups advantageously can be worked up into shaped articles, foils, films, fibres and threads which are distinguished by especially high dyeability, particularly with basic dyestuffs. Polymers having a high content of acid groups are used as ion exchangers, soil improving agents, cross-linking and dispersing agents. Fibre-forming acrylonitrile homopolymers and copolymers may be prepared by the use of a catalytic system known under the term "Redox-system" by the use of peroxy compounds or azo compounds known in the art. It is known to prepare SO₃-containing polymers by polymerizing acrylonitrile in the presence of sulfonate-containing monomers such as styrene sulfonate and ethylene sulfonic acid. Polymers so produced on a technical scale show discoloration.

It has now been found that fibre-forming copolymers having a predominant proportion of bound acrylonitrile are obtained when at least 70% of acrylonitrile, and possibly one or more vinyl- or vinylidene compounds which are copolymerisable with acrylonitrile, are copolymerised with 0.1 to 10% of polymerisable salts of unsaturated S-alkyl- or S-aryl-thiosulfuric acids of the general formula R—S—SO₃X in which R denotes an alkyl- or aryl group which is substituted by a polymerisable unsaturated radical and X denotes an alkalimetal, an ammonium or a substituted ammonium radical.

These copolymers, containing at least 70% acrylonitrile are substituted in the polymer chain by —S—SO₃X— groups, when X denotes hydrogen, an alkalimetal, ammonium or a substituted ammonium radical, and may be transformed during or after the polymerization process to —SX— and/or —SO₂X— groups.

Among the compounds of the general formula R—S—SO₃X where R denotes an alkyl- or aryl group substituted by a polymerisable unsaturated radical such as a vinyl-, vinyl ester-, vinyl ether-, acrylic ester-, methacrylic ester-, acrylamide- or methacrylamide-radical, the following may be mentioned as examples according to the invention:

CH₂=CH—CH₂—S—SO₃X
CH₂=CH—OCO—CH₂—S—SO₃X
CH₂=CH—O—CH₂—CH₂—S—SO₃X
CH₂=CH—COO—CH₂—CH₂—S—SO₃X
CH₂=CH—CO—NH—C₆H₄—S—SO₃X
CH₂=C—CO—NH—C₆H₄—S—SO₃X
   |
   CH₃
CH₂=C—COO—CH₂—CH₂—S—SO₃X
   |
   CH₃
CH₂=CH—C₆H₄—CH₂—S—SO₃X
CH₂=CH—CO—NH—C₆H₄—CH₂—S—CO₃X
CH₂=C—CO—NH—C₆H₄—CH₂—S—SO₃X
   |
   CH₃

Compounds of this type can be prepared quite generally by reacting the corresponding halogen- or epoxy compounds with sodium thiosulphate.

The copolymers should contain about 80% of acrylonitrile and about 0.1–10% of —S—SO₃ groups, preferably between 0.4 and 6%.

In addition to acrylonitrile and compounds of the general formula R—S—SO₃X other co-monomers may be used. The following are examples of compounds which may be used as additional vinyl- copolymerisable or vinylidene compounds, vinyl chloride, vinylidene chloride, vinyl acetate, vinyl pyridine, methyl acrylate, acrylamide, methyl methacrylate, methacrylamide and methacrylonitrile. These co-monomers may be present in an amount of 1% to about 25% in copolymerized form in said copolymers.

Copolymerisation of the salts of compounds of the general formula R—S—SO₃X having at least 70% acrylonitrile and possibly one or more further compounds copolymerisable with them may be carried out in block, solution, dispersion or emulsion.

For the emulsion polymerisation it is possible to use the known emulsifiers such as salts of fatty acids as well as alkyl- or aryl sulphonates and non-ionic emulsifiers such as polyalkylene oxides.

Catalysts used for the polymerisation are radical-forming compounds, e.g. compounds such as hydrogen peroxide, persulphates, hydroperoxides and peroxides. Azo compounds such as azoisobutyric acid dinitrile may equally well be used. Especially suitable for polymerisation in an aqueous medium at pH below 7 are so-called Redox systems such as combinations of persulphates with sulphur compounds of lower valency and other Redox systems, possibly in the presence of small quantities of heavy metals. Polymerization in aqueous medium is carried out in a temperature range range of about +30° C. to about +70° C.

The coplymers obtained according to the invention are used above all for the production of shaped articles, foils, films, filaments and fibres. They can be cross-linked by treatment with alkalis, hydrogen peroxide or alkali sulphides with formation of the disulphide. A surprising advantage of the copolymers according to the invention is that they can be worked up into fibres and filaments which, apart from the usual good fibre properties, have excellent dyeability with basic dyestuffs, so that such fibres and the textiles produced from them can be dyed even to very deep colours. Further, such fibres have a very bright tint in the crude state so that additional bleaching is superfluous for many purposes in the textile field. Another advantage of the copolymers according to the invention is their high thermostability. Even at temperatures of 160° C. there is no significant colour change. Due to the content in —S—SO₃X— groups, the hydrophilic character of acrylonitrile copolymers is enhanced, which results in increased absorption of moisture. The consequent reduction in static charge of the fibres and fabrics produced from the is of great advantage in the working up and use of these products in the textile field. The invention will be more fully described by the following examples which will be understood in an illustrative and not in a limitative manner.

EXAMPLE 1

2480 g. (10 mols) of sodium thiosulphate containing water of crystallisation are dissolved in 3000 ml. of distilled water, treated with 1000 g. (13 mols) of allyl chloride and heated to 45° C. for 3 hours while stirring vigorously. During this stage a clear solution forms. After filtration the solution is evaporated at 50° C. in vacuo and the solid residue is extracted with 4000 ml. of methanol. The methanol solution is brought to dryness and the residue is once crystallized from ethanol giving 1500 g.=86.5% of the theory of colorless, shiny crystals of sodium allyl thiosulphate.

Calculated: C, 20.4; H, 2.85; S, 36.2. Found: C, 20.5; H, 2.95; S, 36.4.

260 parts by weight of desalted water, the pH of which has been adjusted to 2.3 with N surphuric acid are introduced into a polymerisation vessel equipped with stirrer, reflux cooler and dropping funnel. After displacement of the air with nitrogen, the reaction mixture is heated to 55° C. and then 10 parts by weight of acrylonitrile and 28 parts by weight of a 0.5% aqueous solution of sodium pyrosulphite are added. The contents of the vessel begin to cloud within 1 to 2 minutes and the polymer precipitates. 130 parts by weight of acrylonitrile, 435 parts by weight of a 0.231% aqueous potassium persulphate solution and 435 parts by weight of a 0.316% aqueous sodium pyrosulphate solution in which 2.8 parts by weight of allyl thiosulphate are dissolved are now added separately from the dropping funnels in the course of 3 hours while stirring. At the same time, the polymerisation medium is kept at a pH of 2.3 by the addition of N sulphuric acid and the temperature is maintained at 55° C. The mixture is then stirred for another hour at the same temperature and the polymer is removed by suction filtration, washed thoroughly with water and dried at 50° C. in vacuo. 127 parts by weight of a pure white powder, which has a K-value of 81.8 (according to Fikentscher, Cellulosechemie 13, 58 (1932)) and which can be well dyed with basic dyestuffs (polymer A) are obtained.

In a second experiment, polymerisation is carried out as described above but without the addition of allyl thiosulphate. After working up and drying, 128 parts by weight of a white polymer of K-value 83.4 are obtained (polymer B).

Films 50µ in thickness are produced from the polymers obtained in both cases, and these films are first boiled for one hour with pure water. The films are then introduced into a dyestuff solution which contains 0.04% of the blue dyestuff from Example 1 of French patent specification No. 1,158,839 dissolved in water, and the films are kept in this solution for one hour at 95° C. The films are then thoroughly rinsed with water and again treated with water at 95° C. for one hour. 0.5% solutions in dimethyl formamide are prepared from the dyed films and these solutions are tested colourimetrically in a spectral photometer in the region of 380 to 700 mµ. If the dyestuff concentration of the dimethyl formamide solution of the dyed film of polymer B is taken as 100%, then the solution of the dyed film of polymer A is calculated to have a relative dyestuff concentration of 178%.

EXAMPLE 2

310 parts by weight of water and 4.6 parts by weight of N sulphuric acid are placed in a polymerisation vessel. After thorough rinsing with nitrogen, 0.11 parts by weight of potassium persulphate and 0.15 parts by weight of sodium pyrosulphite are added. The polymerisation vessel is heated to 55° C., and in the course of 4 hours a mixture of 133 parts by weight of acrylonitrile and 7 parts by weight of methyl acrylate, a solution of 0.80 parts by weight of potassium persulphate in 429 parts by weight of water acidified with 6.4 parts by weight of N sulphuric acid and a solution which contains 1.10 parts by weight of sodium pyrosulphite and 1.4 parts by weight of allyl thiosulphate dissolved in 435 parts by weight of water are run in at a uniform rate. The polymerisation mixture is kept at the same temperature for another hour and the precipitated polymer is then isolated. After drying at 50° C. in vacuo, 133 parts by weight of a pure white product is obtained which has a K-value of 85.3 and which can be well dyed with basic dyestuffs (polymer C).

Polymerisation is carried out as described above without the addition of allyl thiosulphate. When the polymerisation product has been worked up, 135 parts by weight of a polymer D having a K-value of 86.7 are obtained.

Films are cast from the acrylonitrile copolymers C and D and these films are dyed and then dissolved in dimethyl formamide as described in Example 1. Measurement in the spectral photometer gives a relative dyestuff uptake of 160% for polymer C, taking the dyestuff uptake of polymer D as 100%.

EXAMPLE 3

According to Example 1, 133 parts by weight of acrylonitrile, 7 parts by weight of acrylic acid methylester and 2.1 parts by weight of the sodium salt of N-methyacryloyl oxy-p-ethyl-ureido-N'-ethyl-thiosulfuric acid are polymerized at a temperature of +55° C. in the presence of 1.37 parts by weight of potassium persulfate and 1.87 parts by weight of sodium pyrosulfite. After 5 hours there are obtained 132 parts by weight of a white powder having a K-value of 87. This polymer has an excelled dyeability with basic dyestuffs.

EXAMPLE 4

95 parts by weight of acrylonitrile, 5 parts by weight of acrylic acid methylester and 0.5 part by weight of the sodium salt of vinyloxycarbonyl methyl thiosulfuric acid are polymerized according to Example 3. 86 parts by weight of a white copolymer having a K-value of 78 are obtained. The copolymer shows an excellent dyeability with basic dyestuffs.

What we claim is:

1. A copolymer comprising at least 70% acrylonitrile and 0.1 to 10% of a copolymerizable thiosulfuric acid compound of the formula R—S—SO$_3$X, wherein R is selected from the group consisting of an ethylenically unsaturated alkyl and aryl radical and wherein X is selected from the group consisting of hydrogen, an alkalimetal, the ammonium and a substituted ammonium radical.

2. The copolymer of claim 1 in which about 1% to 25% of a co-monomer selected from the group consisting of a vinyl and a vinylidene monomer being present in copolymerized form in said copolymer.

3. The copolymer of claim 1 in which said copolymerizable thiosulfuric compound is a salt of allyl thiosulfuric acid.

4. The copolymer of claim 1 in which said copolymerizable compound is a salt of vinyloxycarbonyl-methyl thiosulfuric acid.

5. The copolymer of claim 1 in which said copolymerizable compound is a salt of N-methacryloyloxy-β-ethyl-ureido-N'-ethyl-thiosulfuric acid.

6. The copolymer of claim 2 in which said co-monomer is acrylic acid methylester.

7. The product of claim 1 in the form of a fiber.

8. A method for preparing a copolymer containing at least 70% of acrylonitrile and at least one copolymerized monoolefinically unsaturated monomer, which comprises co-polymerizing acrylonitrile in an aqueous medium at a pH of below 7 with a thio sulfuric acid compound of the formula R—S—SO$_3$X, wherein X is selected from the group consisting of an alkalimetal, the ammonium and a substituted ammonium radical, R is selected from the group consisting of an ethylenically unsaturated alkyl and aryl radical, said copolymerizing being effected at a temperature of between +30° to about 70° C. in the presence of an initiator system comprising a watersoluble persulfate and a watersoluble inorganic compound of the 4-valent sulfur.

9. The method of claim 8, wherein the thiosulfuric acid compound is used in form of a salt selected from the group consisting of an alkali metal salt, an amine salt and an ammonium salt.

10. The method of claim 8, wherein said copolymerizing is effected in the presence of an initiator system comprising potassium persulfate, sodium pyrosulfite and a heavy metal ion.

No references cited.

JOSEPH L. SCHOFER, *Primary Examiner.*

D. K. DENENBERG, *Assistant Examiner.*